United States Patent
Basson et al.

(10) Patent No.: US 9,571,713 B2
(45) Date of Patent: Feb. 14, 2017

(54) PHOTOGRAPH AUTHORIZATION SYSTEM

(75) Inventors: Sara H. Basson, White Plains, NY (US); Dimitri Kanevsky, Ossining, NY (US); Edward E. Kelley, Wappingers Falls, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 2229 days.

(21) Appl. No.: 12/329,466

(22) Filed: Dec. 5, 2008

(65) Prior Publication Data

US 2010/0141778 A1 Jun. 10, 2010

(51) Int. Cl.
  H04N 5/228 (2006.01)
  H04N 5/232 (2006.01)

(52) U.S. Cl.
  CPC .................................... *H04N 5/232* (2013.01)

(58) Field of Classification Search
  USPC ....... 348/207.1, 211.1, 211.2, 207.99, 211.3, 348/231.1, 231.2, 232.3; 726/3, 2, 26; 386/200; 725/41, 63; 455/456.1; 715/501.1
  See application file for complete search history.

(56) References Cited

U.S. PATENT DOCUMENTS

| | | | | |
|---|---|---|---|---|
| 6,006,077 A | * | 12/1999 | Shull | ............................ 455/226.2 |
| 6,735,430 B1 | | 5/2004 | Farley et al. | |
| 6,922,568 B1 | * | 7/2005 | Nakamura | ..................... 455/462 |
| 6,937,989 B2 | * | 8/2005 | McIntyre et al. | ............... 705/76 |
| 6,961,540 B1 | | 11/2005 | Kondoh | |
| 7,149,503 B2 | | 12/2006 | Aarnio et al. | |
| 7,336,928 B2 | | 2/2008 | Paalasmaa et al. | |
| 7,379,095 B2 | | 5/2008 | Kondoh | |
| 7,380,708 B1 | * | 6/2008 | Kiliccote | ...................... 235/380 |
| 7,398,104 B2 | | 7/2008 | Yang | |
| 7,414,529 B2 | | 8/2008 | Boss et al. | |
| 7,434,061 B2 | * | 10/2008 | Moseley | ........................ 713/184 |
| 7,725,401 B2 | | 5/2010 | Raley et al. | |
| 2002/0149681 A1 | | 10/2002 | Kahn et al. | |
| 2004/0070678 A1 | * | 4/2004 | Toyama et al. | ............. 348/231.3 |
| 2004/0174443 A1 | * | 9/2004 | Simske | ....................... 348/231.3 |

(Continued)

FOREIGN PATENT DOCUMENTS

| | | |
|---|---|---|
| CN | 101313327 | 11/2008 |
| JP | 2004070614 | 3/2004 |

(Continued)

*Primary Examiner* — Stephen Coleman
(74) *Attorney, Agent, or Firm* — Schmeiser, Olsen & Watts, LLP; John Pivnichny

(57) ABSTRACT

An electronic photographic device that automatically communicates an authorization signal that enables receivers of the authorization signal to authorize use of a likeness captured in a photographic image. The electronic authorization device includes an image capture mechanism for capturing the photographic image, a controller for initiating photographic authorization by generating an authorization signal at the capture of the photographic image by the image capture mechanism and a transmitter for transmitting the authorization signal generated by the controller towards a physical location at which the photographic image is captured. The authorization signal identifies a website URL at which information relating to the captured photographic image can be accessed to allow a person who has received the authorization signal to access the website and provide or deny an authorization for its use.

20 Claims, 6 Drawing Sheets

(56) References Cited

U.S. PATENT DOCUMENTS

| | | | |
|---|---|---|---|
| 2004/0205512 A1* | 10/2004 | Hoover et al. | 715/501.1 |
| 2005/0030384 A1 | 2/2005 | Lee et al. | |
| 2005/0064846 A1 | 3/2005 | Atkin et al. | |
| 2005/0096084 A1* | 5/2005 | Pohja et al. | 455/556.1 |
| 2008/0030588 A1 | 2/2008 | Boss et al. | |
| 2008/0091723 A1* | 4/2008 | Zuckerberg et al. | 707/104.1 |
| 2008/0194270 A1* | 8/2008 | Greenberg | 455/456.1 |
| 2009/0051591 A1* | 2/2009 | Nakajima et al. | 342/367 |
| 2009/0136221 A1 | 5/2009 | Nakamura | |
| 2009/0324022 A1* | 12/2009 | Sangberg et al. | 382/118 |

FOREIGN PATENT DOCUMENTS

| | | |
|---|---|---|
| JP | 2005150939 | 6/2005 |
| JP | 2005190182 | 7/2005 |
| JP | 2007267059 | 10/2007 |
| WO | WO2007/116736 | 10/2007 |

* cited by examiner

PHOTOGRAPH AUTHORIZATION SYSTEM

BACKGROUND

The present invention relates to photography broadly and more specifically relates to a system for signalling persons whose likenesses are captured in a photograph with a URL for a website at which the photograph and related information may be accessed.

Portable electronic devices are in use just about everywhere around the world; PDAs and mobile phones (also known as cell phones) are just a few. One specific feature that is now common on most mobile phones is a digital camera, and/or camcorder to record still photographs or streaming video. The Internet provides an infrastructure that supports applications such as e-mail, file transfer (e.g., digital photographic files) and other resources comprising the World Wide Web (Web) (among other things), which encourages users to create or capture digital photographs and streaming video such that it can be transmitted and accessed via the Internet.

As a result, portable or hand-held electronic devices have developed that are employable to capture digital content such as photographic images and store the files locally and/or remotely. Individuals may upload their photographs, movies, music or the like to one or more websites or servers to enable others to download or otherwise access such content. Alternatively, individuals may send digital files via e-mail, FTP (File Transfer Protocol) or multimedia messaging service (MMS), among other mechanisms, virtually anywhere.

Search engines are utilized to identify relevant content, i.e., files, by utilizing information or data associated with the content. This information is often referred to as metadata, which is defined as data that describes other data. For example, a digital camera can tag a photograph (i.e., a photographic image file) with metadata that includes the date and time the photograph was taken. Users can manually associate metadata with a file. For example, a digital photograph can be decorated with metadata describing people captured by the image, a location at which the image was captured, a description of a photographed event, etc. Captured data such as photographic images, audio, streaming video, amongst other types, can be tagged utilizing information afforded by individuals nearby at the time of capture.

In addition, known technology allows for sending requests for information regarding individuals and/or associated devices within a distance of a digital camera, e.g., the name of camera owner, etc. The ability to identify and tag image data with an identity of a user whose image is captured in a digital photograph, however, does not support enabling the person captured in a photographic image to gain access to the photograph and/or related information. That is, technologies are heretobefore not available that can notify a person whose likeness is captured in a photographic image to enable the person to readily provide or deny permission (authorization) to use the photograph, or the image-captured likeness.

SUMMARY OF THE INVENTION

The shortcomings identified above are in large part addressed by a camera or an electronic device including a camera, a photographic authorization system, an electronic method for authorizing use of a captured photographic image, and a computer program product with instructions for implementing the method wherein a camera or an electronic device including a camera, i.e., a digital camera captures a photographic image (photograph) and automatically generates and sends an authorization signal towards a physical location of the captured photographic image. The authorization signal includes a URL of a website at which the photograph and related information may be accessed by a person whose likeness was captured in the photographic image, and permission for the photographer to use/disseminate the photograph with their likeness can be provided or denied.

In one embodiment, the invention comprises a camera or an electronic device including a camera that transmits such an authorization signal at a time of capture of a photographic image (i.e., photograph) that includes the identification of the website (URL). The camera or electronic device with camera includes image capture means, e.g., a digital camera, for capturing the photographic image, a controller for generating the authorization signal at the capture of the photographic image by the image capture means including identifying in the signal a page at the website at which the photograph and related information can be accessed, and a transmitter for transmitting the authorization signal towards a physical location at which the photographic image is captured. The camera or electronic device with camera includes an adjuster for adjusting the focus of the authorization signal to limit an area for its receipt, relative the physical location and persons captured in the image. The adjuster cooperates with the controller and an antenna from which the signal is radiated.

The authorization signal is intended for receipt by handheld devices in the possession of users proximate the physical location at which the photographic image is captured. Preferably, the hand-held devices are configured to receive the authorization signal comprise cellphones, but may comprise any hand-held electronic device that can receive and parse the authorization signal. The authorization signal is a narrowband, low power signal for transmission in a range substantially limited to a physical location at which the photographic image is captured. The narrowband, low power authorization signal is generated and transmitted in accordance with one of a Bluetooth™ and WiFi standard. In a preferred form, the authorization signal comprises an access passcode that must be presented to access the URL website.

The controller controls strength of the authorization signal transmitted by the transmitter, depending on the distance to objects focused upon in the photographic image. The camera or electronic device with camera includes a viewer, control lines and a knob or switch for adjusting a focus for the transmitted authorization signal. These elements allow the photographer to narrow the signal to a particular footprint, such as a cone shape, defined by angles formed by the width of the photograph and distance from the photographic device to the location at which the photographic image is captured. The intent is to send the authorization signal to be received only by those persons captured in the photographic image.

The antenna is preferably a directional antenna that tracks a field of view (FOV) generated by the image capture means and automatically directs the radiated low power authorization signal towards the FOV. Optionally, the authorization signal takes a form of an infrared signal, such that the antenna within the camera or electronic device with camera comprises an infrared radiator, and the hand-held devices are configured to receive infrared. Alternatively, the camera or electronic device with camera, its antenna and the hand held devices are configured to communicate using near field communications means, requiring that devices be in close proximity to send and receive the authorization signal.

In another embodiment, the invention is an electronic method for authorizing use of a captured photographic image. The method includes steps of capturing a photographic image, and electronically generating an authorization signal comprising an invite to a website at which the captured photographic image and related information can be accessed, the authorization signal including a URL for the website. The method further includes directionally transmitting the authorization signal towards a physical location at which the photographic image is captured and receiving the authorization signal at a hand-held device configured to receive the authorization signal and in possession of a user proximate the physical location at which the photographic image is captured at a time of capture.

The method further includes a step of browsing the website and accessing the captured photographic image and related information after receiving the authorization signal, and also includes steps of electronically transferring the captured photographic image to a server and serving the image and related information to user browsers accessing the website. The step of electronically generating preferably includes generating a passcode included within the authorization signal that must be provided by a user before the image and related information cab be accessed, and the step of step of serving the image and related information preferably includes allowing users to identify a likeness in the photographic image, and authorize or deny authorizing public use the image with their likeness. A computer program product is also included that comprises a tangible storage medium readable by a processing circuit and storing instructions for execution by the processing circuit for performing the method.

In another embodiment, the invention is a photograph authorization system that transmits an authorization signal including a URL website at a time of capture of a photographic image to enable users that receive the signal to visit the website and view the image and related information. The system includes an electronic device for capturing photographic images and sending the authorization signal, at least one hand-held device for receiving the authorization signal and a server for communicating with the electronic device and hand-held device.

The electronic device includes image capture means, e.g., a cellphone camera, for capturing the photographic image, a controller for generating the authorization signal with the website URL at the time of capture of the photographic image by the image capture means, a transmitter for transmitting the authorization signal towards a physical location at which the photographic image is captured. The had-held electronic device, e.g., a cellphone, is configured for receiving the authorization signal at the physical location at which the photographic image is captured.

The server communicates with the electronic photographic device to receive the captured photographic image and authorization signal content and presents the image and related information to user browsers accessing the website, enabling accessing users to authorize or deny authorizing a use of a likeness captured in the photographic image. The server generates and provides an interactive display image enabling a person to view the captured photographic image, identify their likeness in the image and authorize or deny authorization for use of their likeness in the image. The interactive display enables the authorized person to input multimedia data, including text and image data, in association with the captured photographic image.

The transmitter within the electronic device transmits the authorization signal via a narrowband, low power carrier in a range substantially limited to the physical location at which the photographic image is captured. The transmitter is connected to a directional antenna. The controller tracks a field of view (FOV) generated by the image capture means and automatically directs (controls) the direction and focus of the radiated low power authorization signal via the directional antenna. The authorization signal may be generated and transmitted in accordance with one of a Bluetooth™ and WiFi standard, but is not limited thereto. Preferably, the authorization signal further comprises an access passcode that must be first presented to the server in order for the server to provide access to the photographic image and related information at the website.

BRIEF DESCRIPTION OF THE DRAWINGS

Aspects of the invention will become apparent upon reading the following detailed description and upon reference to the accompanying drawings in which, like references may indicate similar elements:

FIG. 6B is a flow diagram depicting a second part of the method of FIG. 6a.

DETAILED DESCRIPTION OF THE INVENTION

Figure 1A:
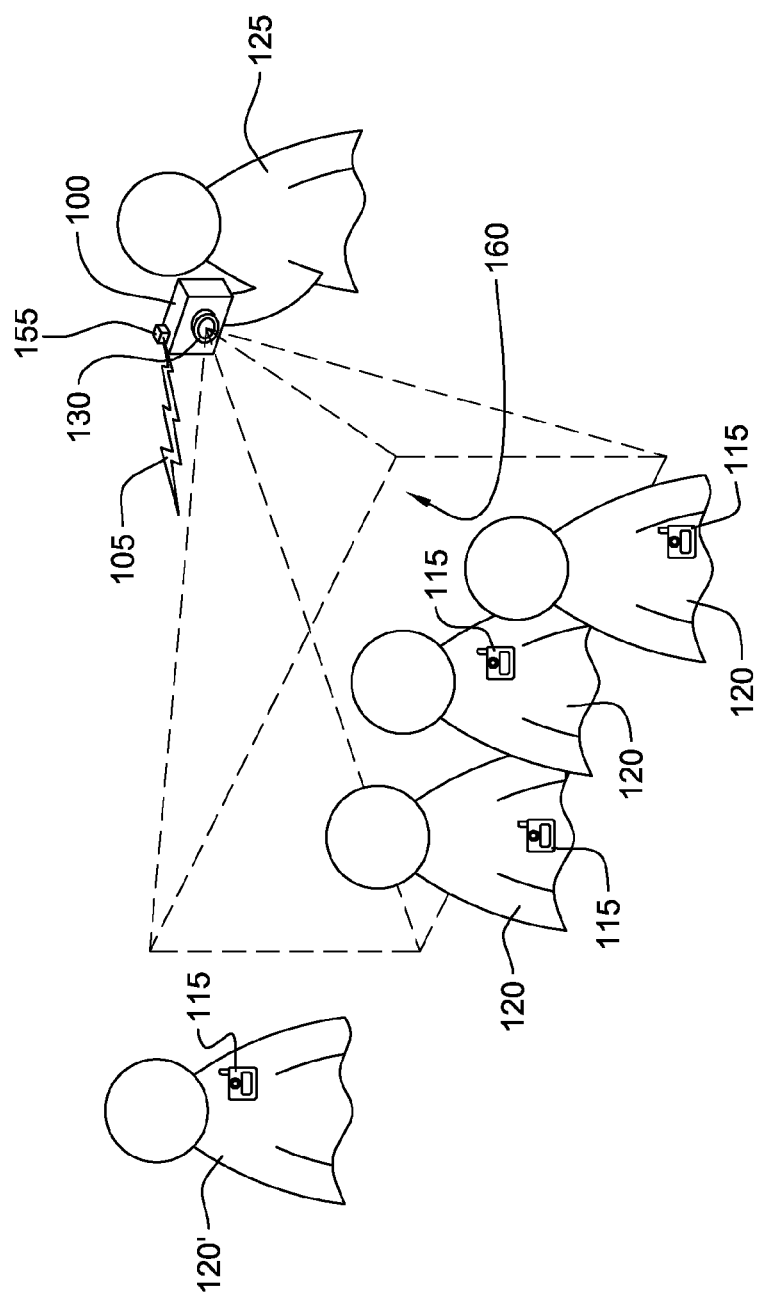
FIG. 1A is schematic representation of an embodiment a use of an electronic device with camera of the invention.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention, as defined by the appended claims. The descriptions below are designed to make such embodiments obvious to a person of ordinary skill in the art.

The invention functions to capture a photographic image (photograph) and automatically generate and send an authorization signal towards a physical location of the captured photographic image for receipt by persons with hand-held devices such a cellphones that are configured to receive such a signal. The signal is broadcast by a camera or an electronic device with camera configured to generate and broadcast the signal. The authorization signal includes a URL of a website at which the photograph and related information may be accessed in order for persons whose likenesses were captured in the photographic image to permit or deny authorization for the photographer to use/disseminate the photograph with the likenesses.

For that matter, even if a person whose likeness is captured does not have a hand-held device, and does not receive the authorization signal, another person who has received the authorization signal may communicate the URL to the person in order that the person can nevertheless access the website to authorize or deny authorization of use. In more detail, the individual whose likeness is captured may visit the website at a URL identified in the authorization signal to authorize, or deny authorization for the photographer to use (e.g., publish) the photograph, or their likeness in the photographic image. The invention thereby addresses privacy concerns of people whose photograph is taken/captured, whether intentionally or unintentionally by a photographer where those people happened to be at the scene or location of the captured image.

The website at the URL may have multiple pages corresponding to multiple captured photographic images, wherein each page corresponds to a single photographic image, and various related information. The page identifications are sequentially numbered, as are and corresponding to the sequentially captured images. Hence, each sequential photographic image has a unique dynamically assigned web address, e.g., the following web addresses beginning with "http://": www.abcd.net/pictures/D013443.jpg, www.abcd.net/pictures/D013444.jpg, and www.abcd.net/pictures/D013445.jpg, which represent three photographic images sequentially captured by the electronic device, downloaded to and stored by the website server. D013443.jpg, D013444.jpg and D013445.jpg are file names generated by a controller at the time the URL is generated in coordination with server information.

The authorization signal sent from the camera or electronic device that includes a camera is a low power, narrow band carrier signal, such as those known to be used in available peer-to-peer communication technologies including without limitation Wi-Fi and Bluetooth. As such, the camera or electronic device with camera is configured to generate and transmit the low power, narrow band signal. The hand-held device in the possession of the person (or related person) captured in the photograph, e.g., a cellphone, is configured to receive the low power, narrowband signal. The camera or electronic device with camera includes an antenna, preferably a directional antenna to focus the low power signal energy in cone-like pattern or footprint defined by the angles formed by the width, height or radius of a field of view (FOV) as seen from the camera, and distance from the camera to the FOV. An adjuster is included on the electronic photographic device to adjust the direction for transmission. The directional antenna can thereby limit transmission of the communication signal to only those people (and their hand-held device) proximate or within the FOV of the captured photographic image.

Optionally the authorization signal may be transmitted via infrared waves or via near field communication technology that uses radio waves with a range of only a few inches. If using near field communications, the communication signal comprising the URL data would have to be transferred by electronic device and camera to the hand-held devices of those individuals whose likenesses are captured, or related persons, by cooperating to bring their hand-held devices enabled for near field communication within close proximity to the electronic device and camera that has captured the photographic image to transfer the authorization signal thereby.

The controller sequentially identifies the photographic image, and associates with it the authorization signal content, the time of image was capture, owner information, geographic data (where the image was captured if GPS data is available), etc. The photographic image and information is then downloaded to the server managing the website, by either wireline or wireless technology. By accessing the website, those people whose images are captured may give the photographer permission or a right to use the photograph and/or their likeness, or advise against use/publication of same.

In a case where authorization to use a captured image is denied, the likeness of the individual can be masked or digitally removed from the captured photograph. In a case of authorization, the individual whose likeness is included may provide writing such as a story to accompany the photograph, other photographs, related photographs or text, etc. The authorization signal may further include an access passcode associated with the particular photograph, and its particular URL, so that only those who have received the authorization signal and access passcode receiver are able to access the photograph at the single URL.

Figure 1B:
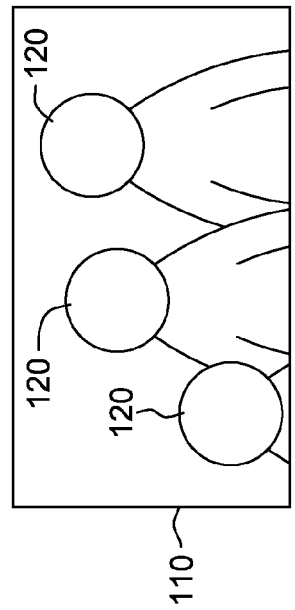
FIG. 1B is a representation of a photographic image captured by the FIG. 1A electronic device with camera.

Turning now to the drawings, FIG. 1A depicts an electronic device with camera (100), or electronic photographic device, which transmits an authorization signal (105) at a time that the device captures a photographic image (FIG. 1B; 110), which upon receipt by a hand-held device or receiver (115) in the possession of a user (120), enables the user to authorize use of a likeness of a user (120) captured in the photographic image. The electronic photographic device (100) is shown held by a photographer (125) in FIG. 1, but may be positions on a tripod, camera stand, mounted, etc., as intended. The electronic photographic device (100) includes image capture means (130) for capturing the photographic image (110), and a controller (140), that is not expressly shown in FIG. 1, for generating the authorization signal (105) at the capture of the photographic image (110) by the image capture means (130). The authorization signal (105) identifies a website URL at which information relating to the photographic image (110) can be accessed by users (120) who have received the authorization signal in the hand-held device (115).

Figure 2A:
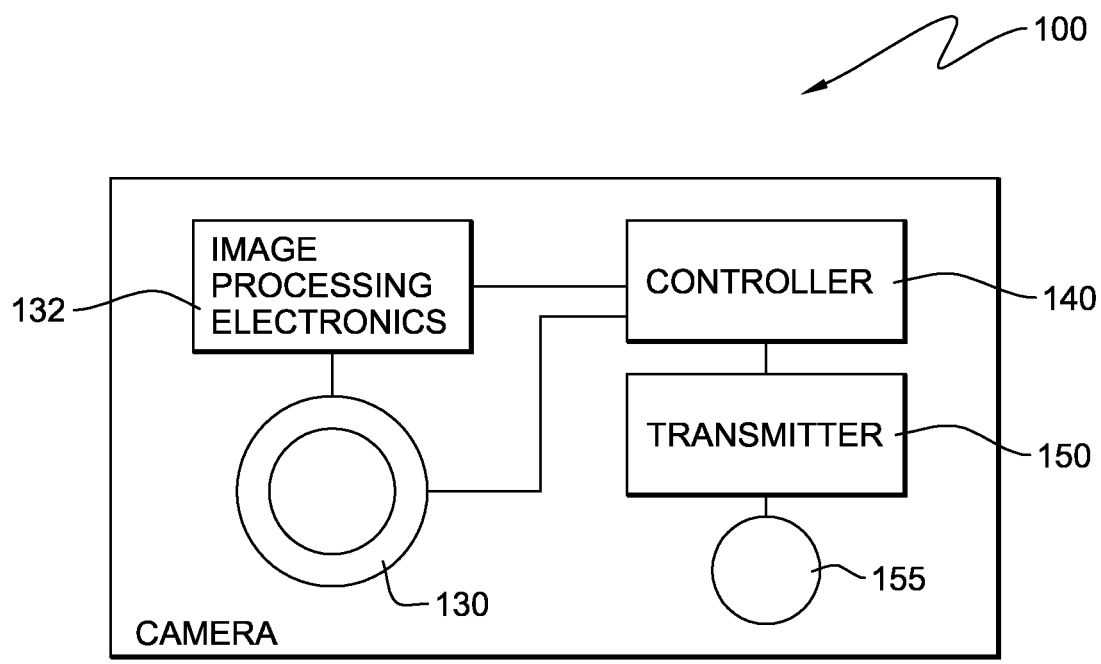
FIG. 2A is a schematic block diagram of the electronic device with camera of FIG. 1A.

The electronic photographic device (100) includes a transmitter (150), depicted in FIG. 2 but not expressly shown in FIG. 1, which drives an antenna (155) that emits the authorization signal (105). The transmitter (150) transmits the authorization signal (105) via the antenna (155) towards a physical location at which the photographic image is captured. The antenna (155) is preferably a directional antenna. The electronic photographic device (100) includes and adjuster (106; FIG. 3) for limiting the shape of a footprint of the broadcast authorization signal energy. Alternatively, the electronic photographic device (100) automatically tracks a field of view (FOV; 160) generated by the image capture means and directs the authorization signal energy to an area proximate the FOV. Ideally, only those persons (120) within the FOV (160) whose likenesses are captured in the photographic image should receive the authorization signal (105). The authorization signal, however, is transmitted from the antenna (155) in such a way that persons such as user (120') that stand outside of but nevertheless proximate the FOV can still receive the authorization signal if in possession of a hand-held receiver (115). The hand-held electronic devices (115) in the possession of the users (120; 120') preferably comprise cellphones, but are not limited thereto. They may take a form of any hand-held electronic device configured to receive an authorization signal transmitted by the electronic photographic device (100) of the invention.

The electronic photographic device (100) is preferably a digital camera that comprises the image capture means (130), the controller (140), the transmitter (150) and antenna (155), e.g., a cellphone camera. The functional operation of electronic photographic device (100) is now explained in detail in cooperation with FIGS. 2A and 2B. FIG. 2A shows image capture means (130) connected to image processing electronics (132). The image capture means (130) preferably comprises a charge coupled device and image processing electronics (132) process the light received thereon to generate an image file. The image capture means (130) and image processing electronics (132) are connected to controller (140) which generates the authorization signal (105). Each sequential photographic image that is captured is dynamically assigned a unique address, e.g., the following web addresses beginning with "http://": www.abcd.net/pictures/D013443.jpg, www.abcd.net/pictures/D013444.jpg, www.abcd.net/pictures/D013445.jpg, or page at the website URL by the controller.

The controller (140) is connected to transmitter (150), which operates with antenna (155) to transmit the authorization signal towards the FOV (160). The authorization signal is transmitted by the antenna as a narrowband, low power signal in a range substantially limited to a physical location of the photographic image capture, or FOV. Preferably, the authorization signal is generated and transmitted in accordance with one of a Bluetooth™ and WiFi standard. The authorization signal preferably includes a passcode that must be presented to access the URL website at which the captured photographic image and related information is accessed. The controller (140) determines and controls the strength of the authorization signal transmitted by the transmitter (150), and antenna (155).

Figure 2B:
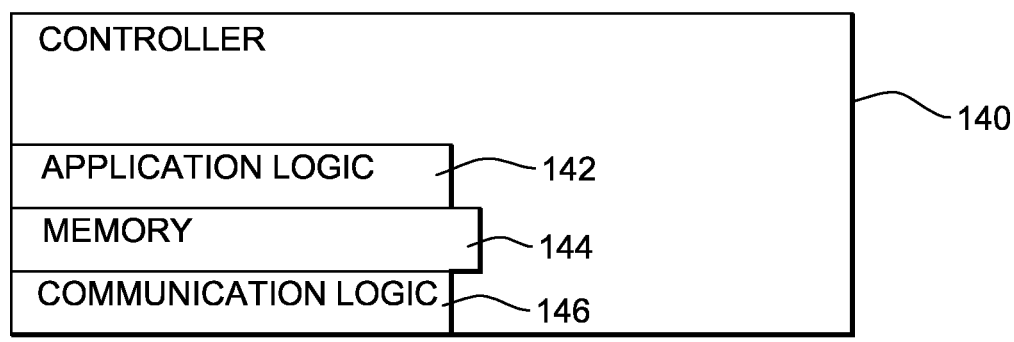
FIG. 2B is a more detailed view of the controller identified in FIG. 2A.
Figure 3:
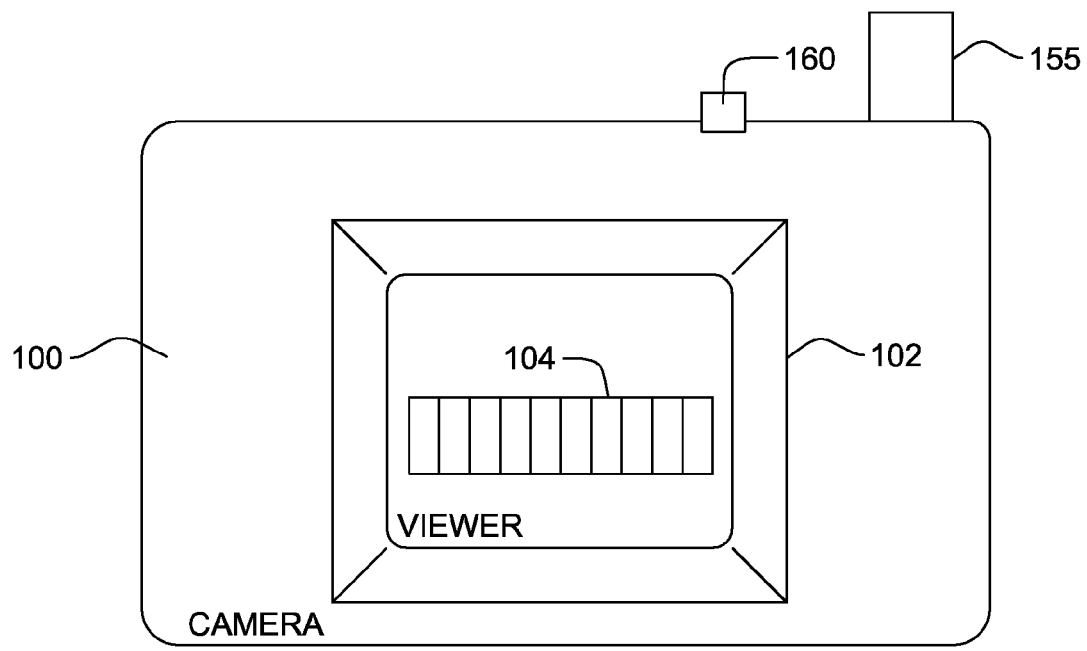
FIG. 3 depicts an expanded view of the electronic device with camera in FIG. 1.

FIG. 2B highlights controller (140). The controller includes application logic (142) that cooperates with control lines (FIG. 4; 104) to determine the direction and shape of the beam that will be radiated at transmission (broadcast) of the authorization signal, and generates the website URL for a particular photograph at capture by adding 1 to an address of a previous page (at the website), as stored in memory (144). Communication logic (142) sends the photograph and authorization signal content to a server (170; FIG. 5).

FIG. 3 depicts a back side of the electronic device with camera (100). A viewer (102) is shown for framing a view to be captured as the photographic image (110). When framing the view, adjustor or control knob (106) is used to set control lines (104) which define the angle of the radiation in which the authorization signal is transmitted. For example, the control knob can set the control lines in order that the authorization signal is radiated in a shape of a cone. When the adjustor or control knob (106) is rotated, the control lines (104) either extend outward to the boundaries of the viewer of contract inwards towards the center of the viewer. The photographer (i.e., user) adjusts the control lines to outline persons in the viewer to which the authorization signal should be directed, to identify the angle and send the narrow band signal to the hand-held devices (e.g., cellphones) of persons viewed.

Figure 4:
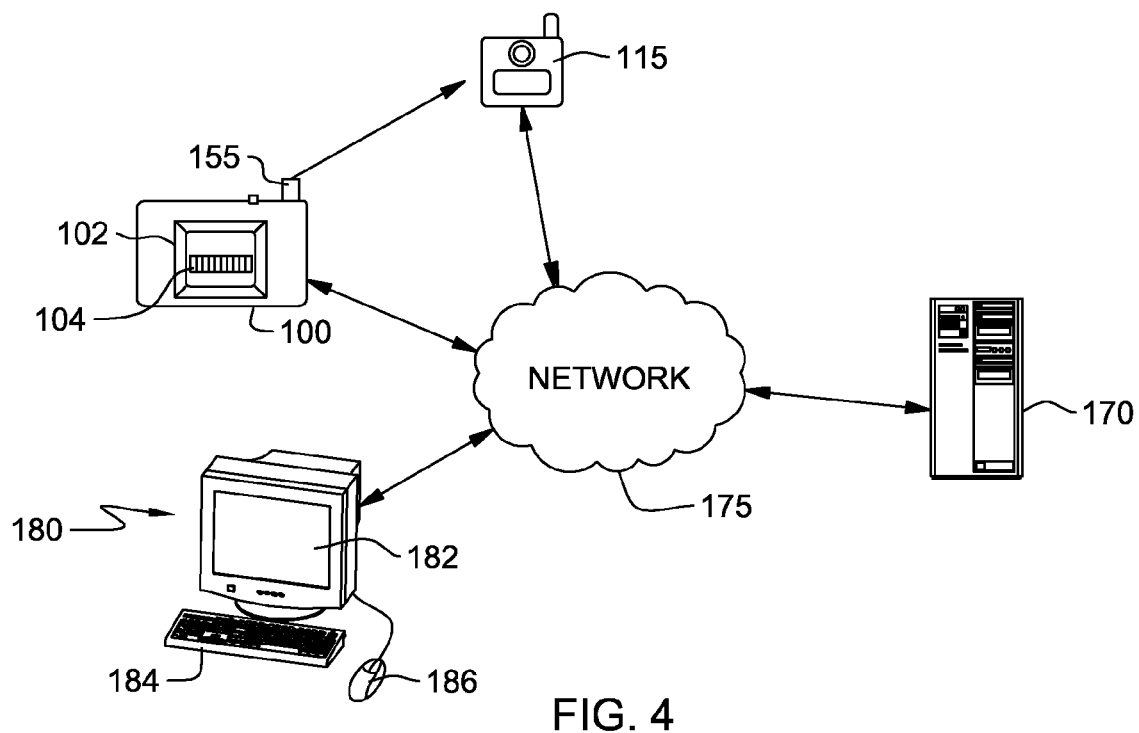
FIG. 4 is a system-level diagram of a photographic authorization system of the invention.

The invention further includes a photograph authorization system (160), a shown in FIG. 4. Photographic authorization system (160) includes an electronic photographic device (100) that transmits an authorization signal (105) at a time of capture of a photographic image (110) to enable users (120) in receipt of the signal to authorize use of a likeness within the captured image, i.e., who have received the signal via hand-held electronic devices (115), preferably cellphones, configured for receiving the authorization signal. The hand-held device (115) receives the broadcast of the authorization signal and website URL, which may further include the captured photographic image, and stores the website URL in a memory (not shown).

System (160) further comprises a server (170) shown connected to the electronic photographic device (100) through a network (175). The network (175) may be a private network, e.g., an Ethernet or may be the Internet. The network (175) may connect the electronic photographic device (110) to the server (170) using wireless or wireline technology. The server (170) communicates with the electronic photographic device (100) to receive the captured photographic image (110) and content of the authorization signal (105), which is stored in memory (not shown). The server (170) presents the photographic image (110) and related information to a user browser (180) accessing the server (170), i.e., the website through the network or Internet (175).

In addition, the hand-held device (115) may communicate directly with the server (170) via the network (175), e.g., by wireless or wireline communication means. The website or server (170) thereby enables users who have received the signal to authorize or deny authorizing the photographer (125; FIG. 1A) use of a likeness captured in the photographic image. The server provides an interactive image on display device (182) that enables a person (120; 120') to view the captured photographic image (110), identify their likeness in the image and authorize or deny authorization for use of their likeness in the image. The user browser (180) preferably includes a user input device, such as keyboard (184) or mouse (186) to enable an authorized person to input multimedia data, including text and image data, in association with the captured photographic image.

Figure 5A:
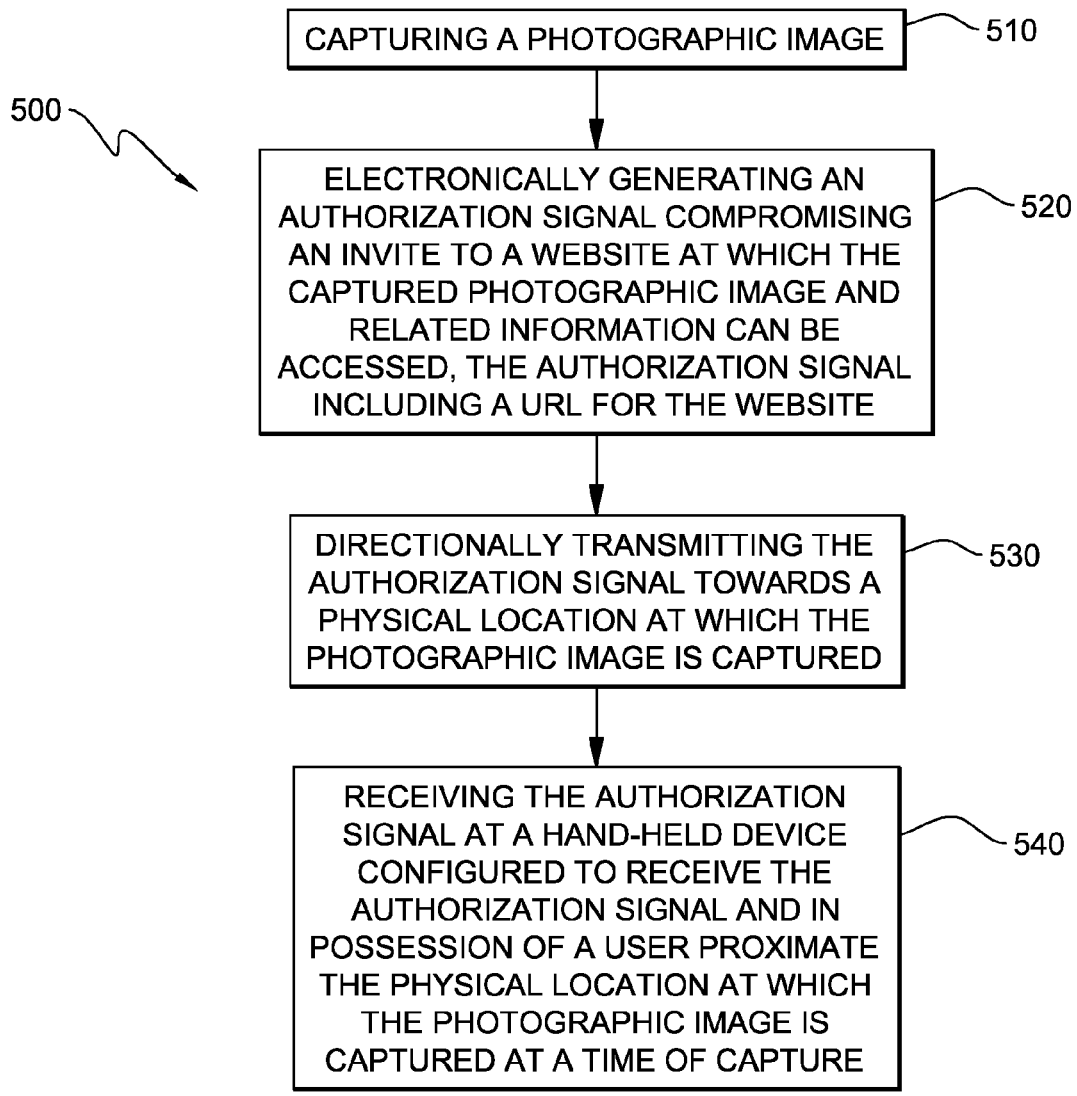
FIG. 5A is a flow diagram depicting an electronic method for authorizing use of a captured photographic image.
Figure 5B:
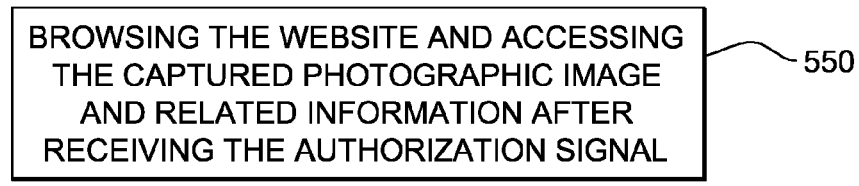
FIG. 5B is a flow diagram depicting an additional step to the FIG. 4A method.

FIG. 5A highlights one embodiment of an electronic method (500) for authorizing use of a captured photographic image in accordance with the invention. Method (500) includes a step of capturing a photographic image (block 510) and a step of electronically generating an authorization signal comprising an invite to a website at which the captured photographic image and related information can be accessed, the authorization signal including a URL for the website (block 520). Further included is a step of directionally transmitting the authorization signal towards a physical location at which the photographic image is captured (block 530) and a step of receiving the authorization signal comprising the invite at a hand-held device configured to receive the authorization signal and present proximate the physical location at which the photographic image is captured (block 540). The method preferably further includes a step of browsing the website and accessing the captured photographic image and related information after receiving the authorization signal, identified as block 550 in FIG. 5B.

The method also includes steps of electronically transferring the captured photographic image to a server and serving the image and related information to user browsers accessing the website. Preferably, the step of electronically generating further includes generating a passcode included within the authorization signal that must be provided by a user before the image and related information can be accessed, and the step of serving the image and related information includes allowing users to identify a likeness in the photographic image, and authorize or deny authorizing public use the image with their likeness.

Figure 6A:
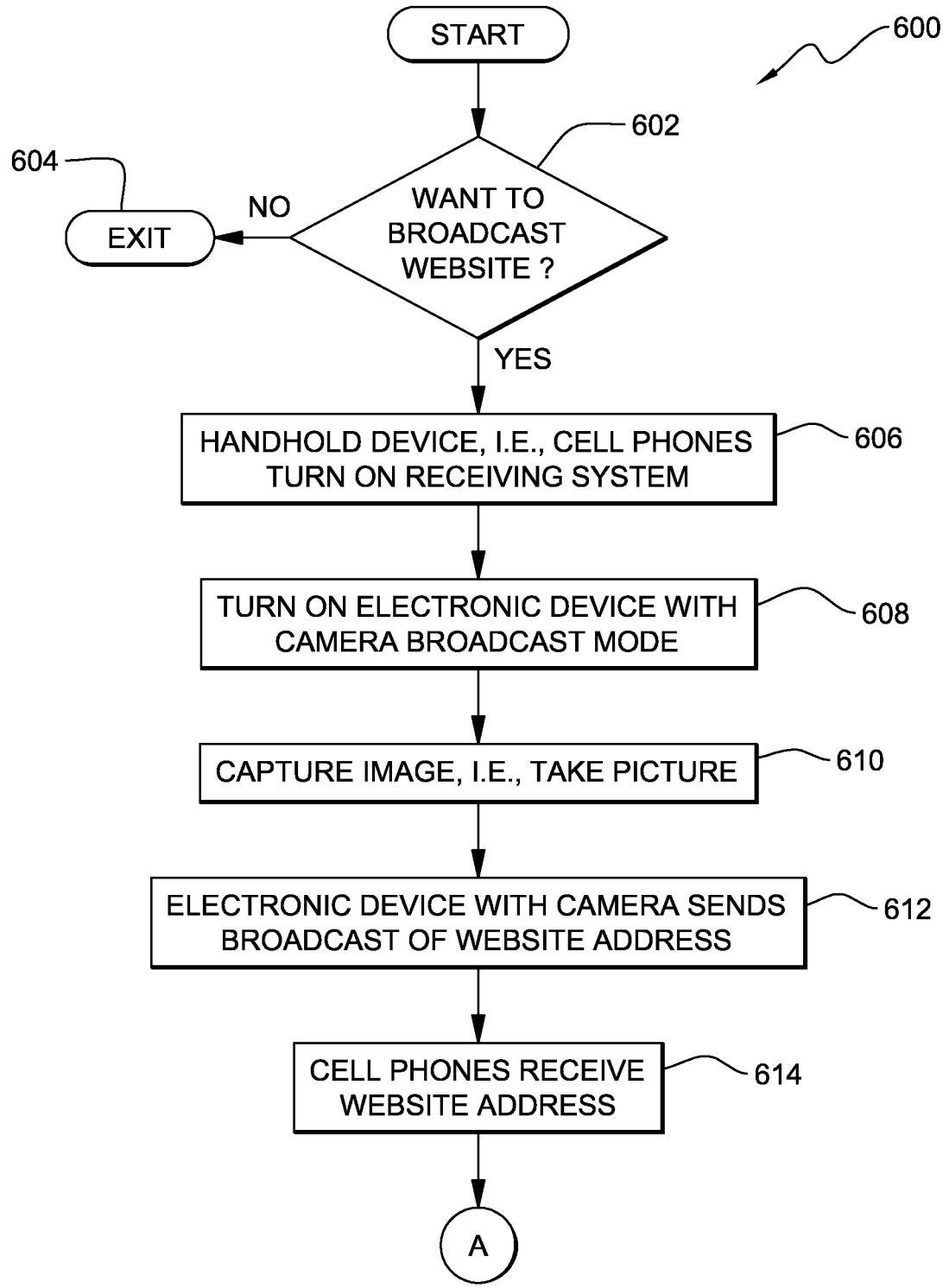
FIG. 6A is a flow diagram depicting a first part of another method for authorizing use of a captured photographic image.
Figure 6B:
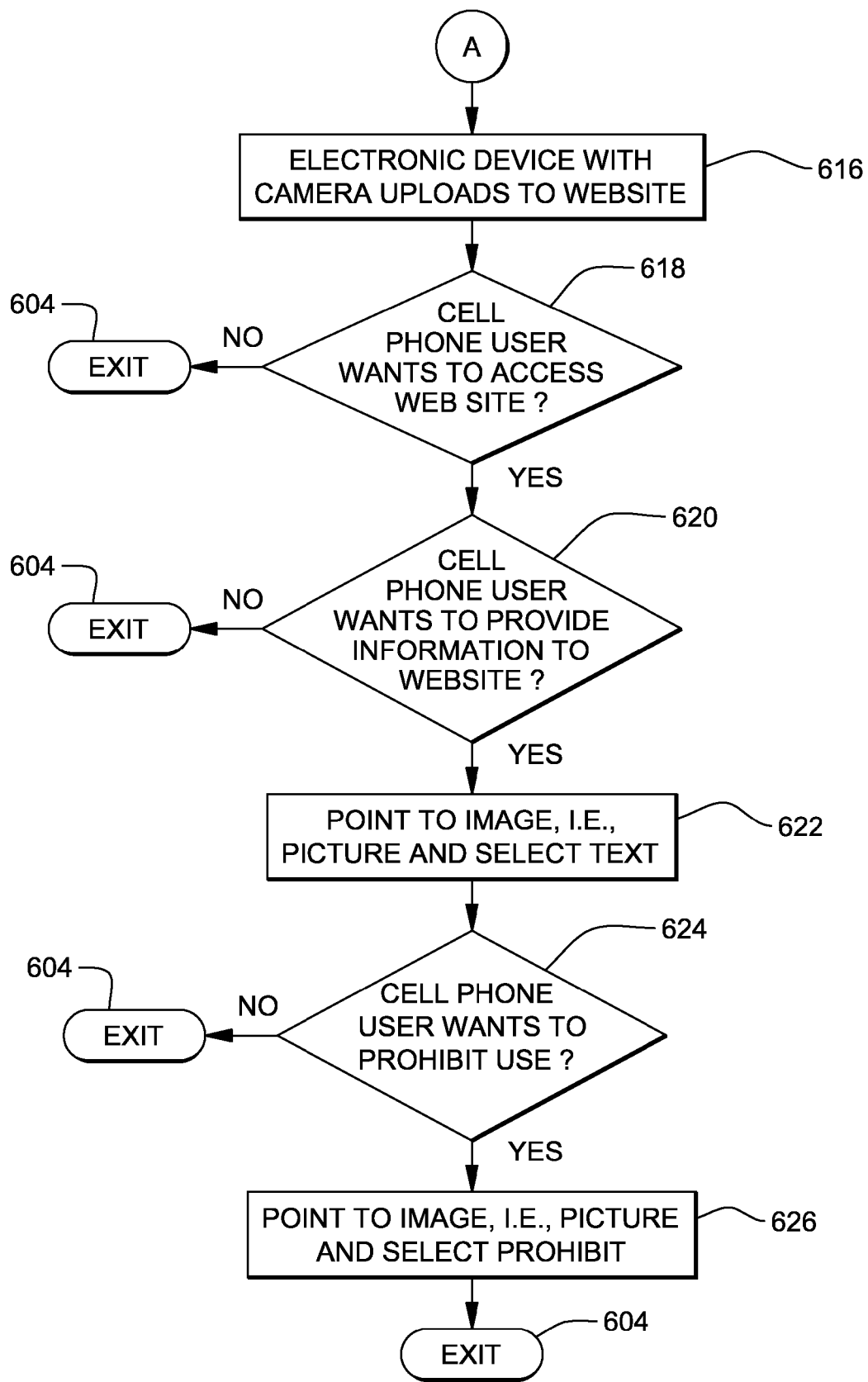

An alternative embodiment of a method for authorizing use of a captured photographic image (600) is described in flow charts of FIGS. 6A and 6B. The method starts in a step identified as block (601). Decision diamond (602) is a step where an electronic device with camera configured to implement the method determines whether a user (i.e., photographer) wants to operate in an authorization signal broadcast mode. If No, the method ends in a step (604), as indicated by "exit." If Yes, a step (606) is implemented whereby persons activate or turn on their hand-held devices, i.e., cell phones with receivers configured to receive the authorization signal and website URL. A step (608) is implemented whereby the electronic photographic device or electronic device with camera is set to broadcast mode for sending the authorization signal. The picture is taken (i.e., photographic image captured) in Step (610). Step (612) includes that the website URL or address is broadcast in the authorization signal. Step (614) includes that the hand-held devices, i.e., cell phones configured to receive, receive the web site address comprising the authorization signal. The designator "A" indicates a break in the flowchart of FIG. 6A, and where the flow chart continues in FIG. 6B.

After designator "A" in FIG. 6B, a step (616) includes that the electronic device with camera uploads picture to the website. The upload includes the photographic image as well as the content of the authorization signal. Decision diamond (618) indicates a step wherein a user in receipt of the authorization signal decides if they wish to access the website. If No, the method ends (Exit), indicated by block (604). If Yes, the program flow moves on to a decision diamond (620) wherein it is determined whether the person accessing lithe website wishes to add information for use in association with the captured picture or photographic image. If No, the method ends (Exit), indicated by block (604). If Yes, the program moves on to a step (622) where the person accessing the website points to a picture or image and selects text. The program flow then moves to decision diamond (624, where it is determined whether the person wishes to prohibit use of the photographic image. If No, the method ends (Exit), indicated by block (604). If Yes, the program flow moves on to a step (626), where they point o the picture or photographic image and select prohibit in the user interface presented by the server. The program ends thereafter in Exit step (604).

In general, the routines executed to implement the embodiments of the invention, may be part of an operating system or a specific application, component, program, module, object, or sequence of instructions. A method or computer program embodiment typically is comprised of a multitude of instructions that will be translated by a native processor into a machine-readable format and hence executable instructions. Also, programs are comprised of variables and data structures that either reside locally to the program or are found in memory or on storage devices. In addition, various programs described herein may be identified based upon the application for which they are implemented in a specific embodiment or component of the invention.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements, which include but are not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system.

For the purposes of this description, a computer-usable or computer readable medium can be any apparatus that can store the program for use by or in connection with the instruction execution system, apparatus, or device. The medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

It will be apparent to those skilled in the art having the benefit of this disclosure that the present invention contemplates systems, methods, media, and apparatuses for disabling camera functionality in a portable device such as a mobile phone. It is understood that the form of the invention shown and described in the detailed description and the drawings are to be taken merely as examples. It is intended that the following claims be interpreted broadly to embrace all the variations of the example embodiments disclosed.

What is claimed is:

1. An electronic photographic device that transmits an authorization signal at a time of capture of a photographic image that enables a user in receipt of the signal to authorize use of a likeness in the captured photographic image, the electronic photographic device comprising:

image capture means for capturing the photographic image at a physical location after the electronic photographic device has been set to an authorization signal broadcast mode configured to broadcast the authorization signal, said photographic image comprising a likeness of a person located at the physical location, said image capture means being a camera;

a controller for generating the authorization signal at the capture of the photographic image by the image capture means, the authorization signal identifying a website URL at which the captured photographic image and information relating to the photographic image can be accessed; and a transmitter for transmitting the authorization signal generated by the controller toward a field of view encompassing the physical location at which the photographic image comprising the likeness of the person is captured and at which the person is located, wherein the authorization signal is transmitted in such a way that persons located outside but proximate the field of view can receive the authorization signal if in possession of a hand-held receiver, wherein the electronic photographic device is configured to determine whether a photographer wants to operate the electronic photographic device in the authorization signal broadcast mode, and wherein the electronic photographic device is configured to be set to the authorization signal broadcast mode for subsequent directional transmission of the authorization signal in response to a determination by the electronic photographic device that the photographer wants to operate the electronic photographic device in the authorization signal broadcast mode and after hand-held devices with receivers configured to receive the authorization signal were activated in conjunction with the determination that the photographer wants to operate the electronic photographic device in the authorization signal broadcast mode.

2. The electronic photographic device as set forth in claim 1, comprising a digital camera, wherein the digital camera comprises the image capture means, the controller, and the transmitter.

3. The electronic photographic device as set forth in claim 1, wherein the authorization signal is generated and transmitted in accordance with one a Bluetooth™ or WiFi standard.

4. The electronic photographic device as set forth in claim 1, wherein the authorization signal further comprises an access passcode that must be presented to access the URL website.

5. The electronic photographic device as set forth in claim 1, wherein the transmitter transmits the authorization signal via a narrowband, low power carrier in a range limited to a physical location at which the photographic image is captured.

6. The electronic photographic device as set forth in claim 1, further comprising broadcast adjusting means to control at least one parameter selected from a height, width, radius, and transmit angle of the authorization signal transmitted.

7. An electronic method for authorizing use of a captured photographic image, comprising steps of:
determining, by an electronic photographic device, whether a photographer wants to operate the electronic photographic device in an authorization signal broadcast mode configured to broadcast an authorization signal;
in response to a determination by the electronic photographic device that the photographer wants to operate the electronic photographic device in the authorization signal broadcast mode and after hand-held devices with receivers configured to receive the authorization signal were activated in conjunction with the determination that the photographer wants to operate the electronic photographic device in the authorization signal broadcast mode, setting the electronic photographic device to the authorization signal broadcast mode for subsequently sending the authorization signal;
after said setting the electronic photographic device to the broadcast mode, capturing, by the electronic photographic device, a photographic image at a physical location, said photographic image comprising a likeness of a person located at the physical location;
electronically generating the authorization signal comprising an invite to a website at which the captured photographic image and related information can be accessed, the authorization signal including a URL for the website;
directionally transmitting the authorization signal toward a field of view encompassing the physical location at which the photographic image comprising the likeness of the person is captured and at which the person is located, said authorization signal having been transmitted in such a way that persons located outside but proximate the field of view can receive the authorization signal if in possession of a hand-held receiver; and
after the directionally transmitted authorization signal has been transmitted to and received by the person at the physical location and after the photographic image at the website has been accessed by the person, receiving from the person at the physical location an authorization or a denial of usage of the photographic image.

8. The method as set forth in claim 7, wherein the step of electronically generating further includes generating a passcode included within the authorization signal that must be provided by a user before the image and related information can be accessed by the user.

9. A computer program product, the computer program product comprising:
a hardware storage device readable by a processing circuit and storing instructions for execution by the processing circuit for performing a method comprising the steps as set forth in claim 7.

10. The method as set forth in claim 7, further comprising:
associating information with the captured photographic image, said information comprising authorization signal content of the photographic image, a time at which the photographic image was captured, data about the owner, and geographic data identifying where the photographic image was captured; and
downloading said information to a server that manages the website.

11. The method as set forth in claim 7, wherein said receiving the authorization or denial of usage comprises receiving the denial of usage, and wherein the method further comprises:
in conjunction with said receiving the denial of usage, masking the likeness of the person in the captured photographic image.

12. A photograph authorization system that transmits an authorization signal at a time of capture of a photographic image to enable users that receive the signal to authorize use of a likeness within the captured photographic image, the photograph authorization system comprising:
an electronic device, comprising:
image capture means for capturing the photographic image at a physical location after the electronic photographic device has been set to an authorization signal broadcast mode configured to broadcast the authorization signal, said photographic image comprising a likeness of a person located at the physical location;

a controller for generating the authorization signal at the capture of the photographic image by the image capture means, the authorization signal identifying a website URL at which information relating to the captured photographic image can be accessed; and a transmitter for directionally transmitting the authorization signal generated by the controller toward a field of view encompassing the physical location at which the photographic image is captured and at which the person is located, wherein the authorization signal is transmitted in such a way that persons located outside but proximate the field of view can receive the authorization signal if in possession of a hand-held receiver, wherein the electronic photographic device is configured to determine whether a photographer wants to operate the electronic photographic device in the authorization signal broadcast mode, and wherein the electronic photographic device is configured to be set to the authorization signal broadcast mode for subsequent directional transmission of the authorization signal in response to a determination by the electronic photographic device that the photographer wants to operate the electronic photographic device in the authorization signal broadcast mode and after hand-held devices with receivers configured to receive the authorization signal were activated in conjunction with the determination that the photographer wants to operate the electronic photographic device in the authorization signal broadcast mode; and a server for communicating with the electronic device to receive the captured photographic image and authorization signal and to present the captured photographic image and related information to user browsers accessing the website, enabling accessing users to authorize or deny authorizing a use of a likeness captured in the photographic image.

13. The photograph authorization system as set forth in claim 12, wherein the authorization signal is generated to comprise an access passcode that must be first presented to the server in order for the server to provide access to the photographic image and related information at the website.

14. The photograph authorization system as set forth in claim 12, wherein the transmitter is adapted to broadcast the authorization signal via a narrowband, low power carrier in a range limited to the physical location at which the photographic image is captured.

15. The photograph authorization system as set forth in claim 12, further comprising broadcast adjusting means to control at least one parameter selected from a height, width, radius, and transmit angle of the authorization signal transmitted.

16. The photograph authorization system as set forth in claim 12, wherein the server provides an interactive display image enabling a person to view the captured photographic image, identify their likeness in the image and authorize or deny authorization for use of their likeness in the image.

17. The photographic authorization system as set forth in claim 16, wherein the interactive display enables the authorized person to input multimedia data, including text and image data, in association with the captured photographic image.

18. The photographic authorization system as set forth in claim 12, wherein the electronic device comprises a digital camera, and wherein the digital camera comprises the image capture means, the controller, and the transmitter.

19. The photograph authorization system as set forth in claim 12, wherein said enabling accessing users consists of enabling accessing users to deny authorizing a use of the likeness of a person captured in the photographic image by having the likeness of the person masked in the captured photographic image.

20. The photograph authorization system as set forth in claim 12, further comprising:

receiving means for receiving from the person at the physical location an authorization or a denial of usage of the photographic image, after the directionally transmitted authorization signal has been transmitted to and received by the person at the physical location and after the photographic image at the website has been accessed by the person.

* * * * *